US012591959B2

(12) United States Patent
Wu

(10) Patent No.: US 12,591,959 B2
(45) Date of Patent: Mar. 31, 2026

(54) METHOD, APPARATUS, AND DEVICE FOR PROCESSING IMAGE, AND STORAGE MEDIUM

(71) Applicant: BOE Technology Group Co., Ltd., Beijing (CN)

(72) Inventor: Yanhong Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 262 days.

(21) Appl. No.: 18/287,033

(22) PCT Filed: Jan. 4, 2023

(86) PCT No.: PCT/CN2023/070279
§ 371 (c)(1),
(2) Date: Oct. 16, 2023

(87) PCT Pub. No.: WO2023/142915
PCT Pub. Date: Aug. 3, 2023

(65) Prior Publication Data
US 2024/0212114 A1 Jun. 27, 2024

(30) Foreign Application Priority Data
Jan. 29, 2022 (CN) ......................... 202210112881.0

(51) Int. Cl.
*G06T 5/92* (2024.01)
*G06T 5/20* (2006.01)
(Continued)

(52) U.S. Cl.
CPC .................. *G06T 5/92* (2024.01); *G06T 5/20* (2013.01); *G06T 5/50* (2013.01); *G06T 5/73* (2024.01);
(Continued)

(58) Field of Classification Search
CPC .... G06T 5/92; G06T 5/20; G06T 5/50; G06T 5/73; G06T 2207/20221;
(Continued)

(56) References Cited

U.S. PATENT DOCUMENTS

2013/0208981 A1 8/2013 Kong
2020/0134786 A1* 4/2020 Gondek .................... G06T 5/73
(Continued)

FOREIGN PATENT DOCUMENTS

CN 103716547 A 4/2014
CN 107767353 A 3/2018
(Continued)

OTHER PUBLICATIONS

J. F. Jarvis, et al., "A Survey of Techniques for the Display of Continuous Tone Pictures on Bilevel Displays", Computer Graphics and Image Processing, vol. 5, Issue 1, Mar. 1976, pp. 13-40.
(Continued)

*Primary Examiner* — Jennifer Mehmood
*Assistant Examiner* — Dustin Bilodeau
(74) *Attorney, Agent, or Firm* — XSENSUS LLP

(57) ABSTRACT

Provided is a method for processing an image. The method comprises: determining a target processing mode corresponding to a first image to be processed; determining, based on the target processing mode, image processing parameters corresponding to the first image; determining, based on the image processing parameters and an initial pixel value of a pixel in the first image, a target pixel value of the pixel point from pixel values corresponding to a plurality of alternative colors; and acquiring a second image by converting the initial pixel value of the pixel in the first image into the target pixel value.

17 Claims, 5 Drawing Sheets

(51) Int. Cl.

| | |
|---|---|
| ***G06T 5/50*** | (2006.01) |
| ***G06T 5/73*** | (2024.01) |
| ***G06V 10/56*** | (2022.01) |
| ***G06V 10/60*** | (2022.01) |
| ***G06V 10/75*** | (2022.01) |

(52) U.S. Cl.
CPC .............. *G06V 10/56* (2022.01); *G06V 10/60* (2022.01); *G06V 10/751* (2022.01); *G06T 2207/20221* (2013.01)

(58) Field of Classification Search
CPC ... G06T 2207/10024; G06T 5/00; G06T 7/90; G06T 5/90; G06V 10/56; G06V 10/60; G06V 10/751
USPC .......................................................... 382/167
See application file for complete search history.

(56) References Cited

U.S. PATENT DOCUMENTS

| | | | | |
|---|---|---|---|---|
| 2021/0142446 | A1* | 5/2021 | Sato | G06T 5/00 |
| 2021/0192262 | A1 | 6/2021 | Yamanaka | |
| 2022/0180823 | A1 | 6/2022 | Wu et al. | |
| 2022/0343865 | A1 | 10/2022 | Liu et al. | |
| 2022/0394154 | A1 | 12/2022 | Wu et al. | |

FOREIGN PATENT DOCUMENTS

| | | | | | |
|---|---|---|---|---|---|
| CN | 108876738 | A | | 11/2018 | |
| CN | 110570380 | A | | 12/2019 | |
| CN | 110796626 | A | | 2/2020 | |
| CN | 111161683 | A | * | 5/2020 | G09G 3/344 |
| CN | 111242878 | A | | 6/2020 | |
| CN | 111243039 | A | | 6/2020 | |
| CN | 112598585 | A | | 4/2021 | |
| CN | 112669233 | A | | 4/2021 | |
| CN | 112734866 | A | | 4/2021 | |
| CN | 113011328 | A | * | 6/2021 | G06F 18/24 |
| CN | 113287162 | A | | 8/2021 | |
| CN | 113314079 | A | | 8/2021 | |
| CN | 113705309 | A | * | 11/2021 | G06F 18/214 |
| CN | 114494073 | A | | 5/2022 | |
| EP | 1389003 | B1 | * | 1/2014 | H04N 1/62 |
| JP | H05290156 | A | | 11/1993 | |
| JP | 2001197405 | A | | 7/2001 | |

OTHER PUBLICATIONS

China National Intellectual Property Administration, First office action of Chinese application No. 202210112881.0 issued on Jan. 20, 2025, which is foreign counterpart application of this US application, total 22 pages including English translation.

* cited by examiner

METHOD, APPARATUS, AND DEVICE FOR PROCESSING IMAGE, AND STORAGE MEDIUM

CROSS-REFERENCE TO RELATED APPLICATIONS

The present disclosure a U.S. national phase application based on PCT/CN2023/070279, filed on Jan. 4, 2023, which is based on and claims priority to Chinese Patent Application No. 202210112881.0 filed on Jan. 29, 2022, and entitled "METHOD, APPARATUS, AND DEVICE FOR PROCESSING IMAGE, AND STORAGE MEDIUM", all of which are hereby incorporated by reference in their entireties for all purposes.

TECHNICAL FIELD

The present disclosure relates to the field of image processing technologies, and in particular, relates to a method, an apparatus, and a device for processing an image, and a storage medium.

BACKGROUND

The electronic ink screen is widely applied to electronic books, electronic paper, shelf labels, electronic table cards, and the like. In the process of displaying an image on the electronic ink screen, the image needs to be processed to acquire an image in two colors of white and black or an image in three colors of red, white, and black, and then the processed image is displayed. Therefore, how to process an image becomes a problem to be solved urgently at present.

SUMMARY

The present disclosure provides a method, an apparatus, and a device for processing an image, and a storage medium. The technical solutions are as follows:

In one aspect, a method for processing an image is provided. The method includes:

determining a target processing mode corresponding to a first image to be processed;

determining, based on the target processing mode, image processing parameters corresponding to the first image;

determining, based on the image processing parameters and an initial pixel value of a pixel in the first image, a target pixel value of the pixel from pixel values corresponding to a plurality of alternative colors; and acquiring a second image by converting the initial pixel value of the pixel in the first image into the target pixel value.

In some embodiments, determining the target processing mode corresponding to the first image to be processed includes:

acquiring an identification result by identifying a type of an object in the first image;

determining, in a case that the identification result includes one object type and the object type is a first object type, an image processing mode corresponding to the first object type in a plurality of image processing modes as a candidate processing mode corresponding to the first image; and determining, based on the candidate processing mode, the target processing mode.

In some embodiments, determining the target processing mode corresponding to the first image to be processed includes:

acquiring an identification result by identifying a type of an object in the first image;

determining, in a case that the identification result includes a plurality of object types, area ratios of imaging areas of objects respectively corresponding to the plurality of object types in the first image;

determining an image processing mode corresponding to a second object type in the plurality of image processing modes as a candidate processing mode corresponding to the first image, wherein the second object type is an object type with a largest area ratio in the plurality of object types; and determining, based on the candidate processing mode, the target processing mode.

In some embodiments, determining, based on the candidate processing mode, the target processing mode includes:

displaying a first user interface, wherein the first user interface includes description information of the candidate processing mode;

determining, in response to a mode confirmation instruction, the candidate processing mode as the target processing mode; and determining, in response to a mode customization instruction, a customized mode as the target processing mode.

In some embodiments, determining, based on the target processing mode, the image processing parameters corresponding to the first image includes:

determining, in a case that the target processing mode is one of a plurality of image processing modes, image processing parameters corresponding to the target processing mode as the image processing parameters corresponding to the first image.

In some embodiments, determining, based on the target processing mode, the image processing parameters corresponding to the first image includes:

displaying, in a case that the target processing mode is a customized mode, a second user interface, wherein the second user interface includes a plurality of customized parameter items;

acquiring customized parameters input in the plurality of customized parameter items; and determining the customized parameters input in the plurality of customized parameter items as the image processing parameters corresponding to the first image.

In some embodiments, the plurality of alternative colors include a first alternative color having a hue, and the image processing parameters include a first color ratio, wherein the first color ratio is configured to distinguish the first alternative color from other alternative colors; and determining, based on the image processing parameters and the initial pixel value of the pixel in the first image, the target pixel value of the pixel from the pixel values corresponding to the plurality of alternative colors includes:

determining a distance between the initial pixel value of the pixel and a pixel value corresponding to the first alternative color; and determining, in a case that the distance is smaller than a distance threshold corresponding to the first color ratio, the pixel value corresponding to the first alternative color as the target pixel value of the pixel.

In some embodiments, the plurality of alternative colors further include a second alternative color having no hue and a third alternative color having no hue, a gray scale of the second alternative color being smaller than a gray scale of the third alternative color, and the image processing parameters further include a second color ratio, the second color ratio being configured to distinguish the second alternative color from the third alternative color; and upon determining the distance between the initial pixel value of the pixel and the pixel value corresponding to the first alternative color, the method further includes:

determining, in response to the distance being not smaller than the distance threshold corresponding to the first color ratio, a gray-scale value of the pixel in the first image based on the initial pixel value; and determining the target pixel value of the pixel according to the gray-scale value; wherein, determining, in a case that the gray-scale value is smaller than a gray-scale threshold corresponding to the second color ratio, a pixel value corresponding to the second alternative color as the target pixel value of the pixel; and determining, in a case that the gray-scale value is not smaller than the gray-scale threshold corresponding to the second color ratio, a pixel value corresponding to the third alternative color as the target pixel value of the pixel.

In some embodiments, the image processing parameters further include a contrast enhancement ratio; and prior to determining, based on the image processing parameters and the initial pixel value of the pixel in the first image, the target pixel value of the pixel from the pixel values corresponding to the plurality of alternative colors, the method further includes:

performing, based on the contrast enhancement ratio, contrast enhancement processing on the first image.

In some embodiments, performing, based on the contrast enhancement ratio, contrast enhancement processing on the first image includes:

transforming the first image from an RGB color space to an HSV color space;

acquiring first brightness by determining a mean value of V components of pixels in the first image;

performing, based on a gamma transformation parameter corresponding to the contrast enhancement ratio, gamma transformation on the V component of each of the pixels;

acquiring second brightness by determining a mean value of the V components of the pixels after gamma transformation;

acquiring the first image with an enhanced contrast in the HSV color space by keeping H components and S components of the pixels unchanged, and adding a difference between the first brightness and the second brightness on the V components of the pixels after gamma transformation; and acquiring the first image with an enhanced contrast by transforming the first image with the enhanced contrast in the HSV color space to the RGB space.

In some embodiments, the image processing parameters further include a sharpening ratio; and prior to determining, based on the image processing parameters and the initial pixel value of the pixel in the first image, the target pixel value of the pixel from the pixel values corresponding to the plurality of alternative colors, the method further includes:

performing, based on the sharpening ratio, sharpening processing on the first image.

In some embodiments, performing, based on the sharpening ratio, sharpening processing on the first image includes:

acquiring a brightness channel map by transforming the first image from an RGB color space to an HSV color space;

acquiring a first filtered map by performing, based on the sharpening ratio, guided filtering on the brightness channel map;

acquiring a first detail map by separating the first filtered map from the brightness channel map;

acquiring a first enhancement map by superposing the first detail map onto the brightness channel map;

acquiring a second filtered map by performing, based on the sharpening ratio, Gaussian filtering on the first enhancement map;

acquiring a second detail map by separating the second filtered map from the first enhancement map;

acquiring a second enhancement map by superposing the second detail map onto the first enhancement map; and acquiring a sharpened first image by transforming the second enhancement map from the HSV color space to the RGB color space.

In some embodiments, the image processing parameters further include an error truncation ratio; and prior to converting the initial pixel value of the pixel in the first image into the target pixel value, the method further includes:

acquiring an error value by determining a difference between the initial pixel value and the target pixel value; and performing, based on the error value and the error truncation ratio, error diffusion on the target pixel value.

In some embodiments, the method further includes:

displaying a third user interface, wherein the third user interface includes a third image, the third image including at least two different second images converted from the first image.

In another aspect, an apparatus for processing an image is provided. The apparatus includes:

a first determining module, configured to determine a target processing mode corresponding to a first image to be processed;

a second determining module, configured to determine, based on the target processing mode, image processing parameters corresponding to the first image;

a third determining module, configured to determine, based on the image processing parameters and an initial pixel value of a pixel in the first image, a target pixel value of the pixel from pixel values corresponding to a plurality of alternative colors; and a converting module, configured to acquire a second image by converting the initial pixel value of the pixel in the first image into the target pixel value.

In some embodiments, the first determining module includes:

a first identifying unit, configured to acquire an identification result by identifying a type of an object in the first image;

a first determining unit, configured to determine, in a case that the identification result includes one object type and the object type is a first object type, an image processing mode corresponding to the first object type in a plurality of image processing modes as a candidate processing mode corresponding to the first image; and a second determining unit, configured to determine, based on the candidate processing mode, the target processing mode.

In some embodiments, the first determining module includes:

a second identifying unit, configured to acquire an identification result by identifying a type of an object in the first image;

a third determining unit, configured to determine, in a case that the identification result includes a plurality of object types, area ratios of imaging areas of objects respectively corresponding to the plurality of object types in the first image;

a fourth determining unit, configured to determine an image processing mode corresponding to a second object type in the plurality of image processing modes as a candidate processing mode corresponding to the first image, wherein the second object type is an object type with a largest area ratio in the plurality of object types; and a fifth determining unit, configured to determine, based on the candidate processing mode, the target processing mode.

In some embodiments, the second determining unit or the fifth determining unit is specifically configured to:

display a first user interface, wherein the first user interface comprises description information of the candidate processing mode;

determine, in response to a mode confirmation instruction, the candidate processing mode as the target processing mode; and determine, in response to a mode customization instruction, a customized mode as the target processing mode.

In some embodiments, the second determining module is specifically configured to:

determine, in a case that the target processing mode is one of a plurality of image processing modes, image processing parameters corresponding to the target processing mode as the image processing parameters corresponding to the first image.

In some embodiments, the second determining module is specifically configured to:

display, in a case that the target processing mode is a customized mode, a second user interface, wherein the second user interface comprises a plurality of customized parameter items;

acquire customized parameters input in the plurality of customized parameter items; and determine the customized parameters input in the plurality of customized parameter items as the image processing parameters corresponding to the first image.

In some embodiments, the plurality of alternative colors include a first alternative color having a hue, and the image processing parameters include a first color ratio, wherein the first color ratio is configured to distinguish the first alternative color from other alternative colors; and the third determining module is specifically configured to:

determine a distance between the initial pixel value of the pixel and a pixel value corresponding to the first alternative color; and determine, in a case that the distance is smaller than a distance threshold corresponding to the first color ratio, the pixel value corresponding to the first alternative color as the target pixel value of the pixel.

In some embodiments, the plurality of alternative colors further include a second alternative color having no hue and a third alternative color having no hue, a gray scale of the second alternative color being smaller than a gray scale of the third alternative color, and the image processing parameters further include a second color ratio, the second color ratio being configured to distinguish the second alternative color from the third alternative color; and the third determining module is further specifically configured to:

determining, in response to the distance being not smaller than the distance threshold corresponding to the first color ratio, a gray-scale value of the pixel in the first image based on the initial pixel value; and determining the target pixel value of the pixel based on the gray-scale value; wherein, determining, in a case that the gray-scale value is smaller than a gray-scale threshold corresponding to the second color ratio, a pixel value corresponding to the second alternative color as the target pixel value of the pixel; and determining, in a case that the gray-scale value is not smaller than the gray-scale threshold corresponding to the second color ratio, a pixel value corresponding to the third alternative color as the target pixel value of the pixel.

In some embodiments, the image processing parameters further include a contrast enhancement ratio; and the apparatus further includes:

a contrast enhancement processing module, configured to perform, based on the contrast enhancement ratio, contrast enhancement processing on the first image.

In some embodiments, the contrast enhancement processing module is specifically configured to:

transform the first image from an RGB color space to an HSV color space;

acquire first brightness by determining a mean value of V components of pixels in the first image;

perform, based on a gamma transformation parameter corresponding to the contrast enhancement ratio, gamma transformation on the V component of each of the pixels;

acquire second brightness by determining a mean value of the V components of the pixels after gamma transformation;

acquire the first image with an enhanced contrast in the HSV color space by keeping H components and S components of the pixels unchanged, and add a difference between the first brightness and the second brightness on the V components of the pixels after gamma transformation; and acquire the first image with an enhanced contrast by transforming the first image with the enhanced contrast in the HSV color space to the RGB space.

In some embodiments, the image processing parameters further include a sharpening ratio; and the apparatus further includes:

a sharpening processing module, configured to perform, based on the sharpening ratio, sharpening processing on the first image.

In some embodiments, the sharpening processing module is specifically configured to:

acquire a brightness channel map by transforming the first image from an RGB color space to an HSV color space;

acquire a first filtered map by performing, based on the sharpening ratio, guided filtering on the brightness channel map;

acquire a first detail map by separating the first filtered map from the brightness channel map;

acquire a first enhancement map by superposing the first detail map onto the brightness channel map;

acquire a second filtered map by performing, based on the sharpening ratio, Gaussian filtering on the first enhancement map;

acquire a second detail map by separating the second filtered map from the first enhancement map;

acquire a second enhancement map by superposing the second detail map onto the first enhancement map; and acquire a sharpened first image by transforming the second enhancement map from the HSV color space to the RGB color space.

In some embodiments, the image processing parameters further include an error truncation ratio; and the apparatus further includes:

a fourth determining module, configured to acquire an error value by determining a difference between the initial pixel value and the target pixel value; and an error diffusion module, configured to perform, based on the error value and the error truncation ratio, error diffusion on the target pixel value.

In some embodiments, the apparatus further includes:

a display module, configured to display a third user interface, wherein the third user interface includes a third image, the third image including at least two different second images converted from the first image.

In another aspect, a device for processing an image is provided. The device for processing the image includes a memory and a processor, wherein the memory is configured to store a computer program, and the processor is configured to execute the computer program stored in the memory, to perform the steps of the method for processing the image described above.

In another aspect, a non-transitory computer-readable storage medium storing a computer program is provided. The computer program, when executed by a processor, causes the processor to perform the steps of the method for processing the image described above.

In another aspect, a computer program product including one or more instructions is provided. The instructions, when executed by a computer, cause the computer to perform the steps of the method for processing the image described above.

BRIEF DESCRIPTION OF THE DRAWINGS

For clearer descriptions of the technical solutions according to the embodiments of the present disclosure, the drawings to be referred to for the description of the embodiments are briefly introduced below. Apparently, the drawings in the description below merely illustrate some embodiments of the present disclosure, and those skilled in the art may also derive other drawings according to the drawings without creative efforts.

DETAILED DESCRIPTION

Figure 1:
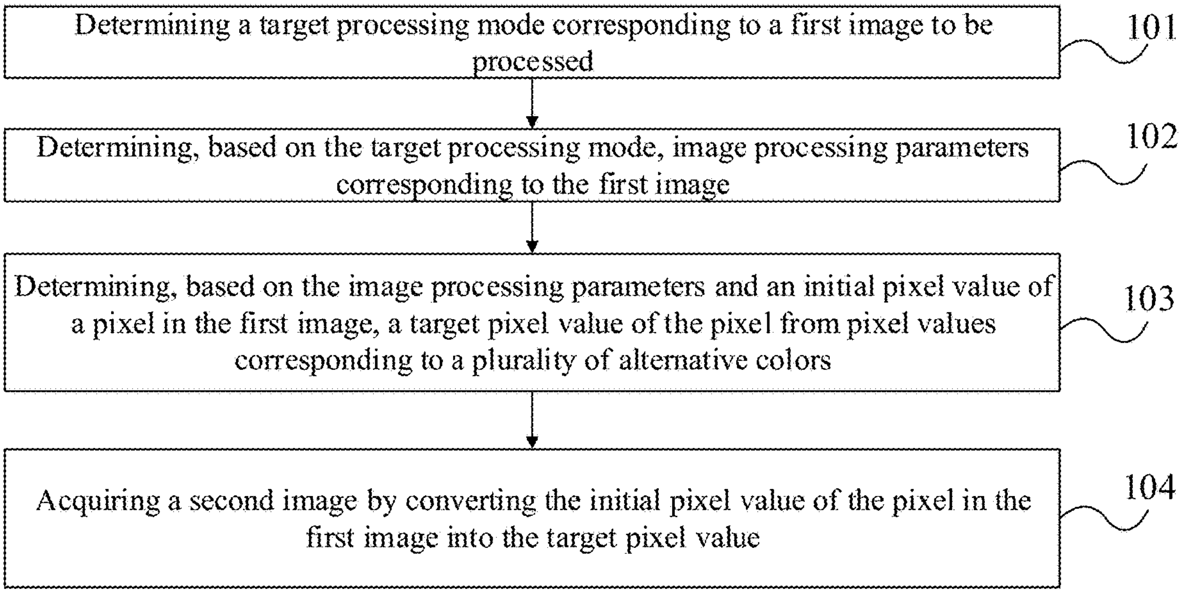
FIG. 1 is a flowchart of a method for processing an image according to some embodiments of the present disclosure.

To make the objects, technical solutions, and advantages of the present disclosure clearer, embodiments of the present disclosure are further described in detail below with reference to the accompanying drawings.

Prior to explaining a method for processing an image provided in the embodiments of the present disclosure in detail, an application scenario provided in the embodiments of the present disclosure is introduced.

The method for processing the image provided in the embodiments of the present disclosure is applicable to various scenarios. For example, in a scenario of displaying an image on an electronic ink screen, a first image in color is usually converted into a second image in two colors of white and black or a second image in three colors of red, white, and black, so as to display the second image. However, in the process of processing the first image, as the image processing parameters are unchanged, the converted second image cannot meet the users' usage needs in different scenarios. Therefore, in the method for processing the image provided in the embodiments of the present disclosure, the target processing mode corresponding to the first image to be processed is determined, and the image processing parameters corresponding to the first image are determined based on the target processing mode. Then, based on the image processing parameters and an initial pixel value of a pixel in the first image, a target pixel value of the pixel is determined from pixel values corresponding to a plurality of alternative colors, and the initial pixel value of the pixel in the first image is converted into the target pixel value to acquire a second image. In this way, the users' usage needs in different scenarios can be met.

The method for processing the image provided in the embodiments of the present disclosure is performed by using a device for processing an image, and the device for processing the image may be a terminal device such as a fixed terminal, a mobile terminal, or the like. The terminal device may be any electronic product capable of performing human-computer interaction with a user through one or more modes such as a keyboard, a touch pad, a touch screen, a remote controller, a voice interaction or handwriting device, and the like, for example, a personal computer (PC), a mobile phone, a smart phone, a personal digital assistant (PDA), a pocket PC (PPC), a tablet computer, and the like.

Those skilled in the art should understand that the above application scenarios and the device for processing the image are only examples, and other existing or future application scenarios and the device for processing the image applicable to the embodiments of the present disclosure are also included in the protection scope of the embodiments of the present disclosure and are hereby incorporated by reference.

It should be noted that the application scenarios described in the embodiments of the present disclosure are intended to describe the technical solutions in the embodiments of the present disclosure more clearly, but do not constitute a limitation on the technical solutions provided in the embodiments of the present disclosure. Those of ordinary skill in the art may know that the technical solutions provided in the embodiments of the present disclosure are also applicable to a similar technical problem with the presence of new application scenarios.

The method for processing the image provided in the embodiments of the present disclosure is explained in detail as follows.

FIG. 1 is a flowchart of a method for processing an image according to some embodiments of the present disclosure. Referring to FIG. 1, the method includes the following steps.

In step 101, a target processing mode corresponding to a first image to be processed is determined.

The execution body of the embodiments of the present disclosure may be a terminal device such as a fixed terminal, a mobile terminal, and the like, and for ease of description, the mobile terminal is taken as an example to be introduced next.

The mobile terminal identifies a type of an object in the first image to be processed to acquire an identification result. In the case that the identification result includes one object type and the object type is a first object type, an image processing mode corresponding to the first object type in a plurality of image processing modes is determined as a candidate processing mode corresponding to the first image. In the case that the identification result includes a plurality of object types, area ratios of imaging areas of objects respectively corresponding to the plurality of object types in the first image are determined, and an image processing mode corresponding to a second object type in the plurality of image processing modes is determined as a candidate processing mode corresponding to the first image, wherein the second object type is an object type with a largest area ratio in the plurality of object types. The target processing mode corresponding to the first image is determined based on the candidate processing mode corresponding to the first image.

The type of objects in the first image may be a portrait, a text, and a landscape, or may be other types, which is not limited in the embodiments of the present disclosure. The plurality of image processing modes include a portrait mode, a text mode, and a landscape mode. The plurality of image processing modes may also include other modes, which are not limited in the embodiments of the present disclosure.

The first image to be processed is downloaded by a user from another webpage through the mobile terminal, or is selected by the user from a plurality of images stored in the mobile terminal. In the case that the mobile terminal detects an image processing operation of the user, the mobile terminal displays an input interface of the first image to be processed, wherein the input interface includes two options of off-site downloading and local selection. In the case that the user clicks the option of "off-site downloading", the user downloads the first image to be processed from another webpage through the mobile terminal. In the case that the user clicks the option of "local selection", the user selects the first image to be processed from a plurality of images stored in the mobile terminal.

The plurality of image processing modes correspond to the plurality of object types in a one-to-one manner. Namely, different image processing modes correspond to different object types. Therefore, after the mobile terminal determines the first object type, an image processing mode corresponding to the first object type is selected from the plurality of image processing modes and is determined as a candidate processing mode corresponding to the first image.

Similarly, after the mobile terminal determines a second object type, an image processing mode corresponding to the second object type is also selected from the plurality of image processing modes, and the image processing mode is determined as a candidate processing mode corresponding to the first image.

In the case that the identification result only includes one object type and is the first object type, it indicates that only objects of the first object type exist in the first image to be processed, and the image processing mode corresponding to the first object type is close to the image content of the first image. At this time, the image processing mode corresponding to the first object type is determined from the plurality of image processing modes as the candidate processing mode corresponding to the first image. In the case that the identification result includes a plurality of object types, it indicates that objects of a plurality of object types exist in the first image to be processed. At this time, to accurately determine the candidate processing mode corresponding to the first image, an object type with a largest area ratio in the plurality of object types is determined as a second object type, and then the image processing mode corresponding to the second object type in the plurality of image processing modes is determined as the candidate processing mode corresponding to the first image. In this way, a second object type that is more suitable for the image content of the first image is preferentially determined from the plurality of object types.

The area ratio of the object type refers to a ratio of an area occupied by an imaging area of an object corresponding to the object type in the first image to the total area of the first image.

For example, the identification result includes a plurality of object types, wherein the object types are a portrait, a text, and a landscape. The mobile terminal determines that the area ratios of the imaging areas of the objects corresponding to the plurality of object types in the first image are 50%, 20%, and 30%, respectively. Namely, the area ratios of the imaging areas of the portrait, the text, and the landscape in the first image are 50%, 20%, and 30%, respectively. As the area ratio of the imaging area of the portrait in the first image is the largest, the portrait is determined as the second object type, and then an image processing mode corresponding to the portrait in the plurality of image processing modes is determined as the candidate processing mode corresponding to the first image.

The mobile terminal directly determines the candidate processing mode corresponding to the first image as the target processing mode corresponding to the first image. Namely, after the mobile terminal determines the candidate processing mode, the candidate processing mode is automatically determined as the target processing mode. Alternatively, the user determines whether the candidate processing mode needs to be determined as the target processing mode.

As an example, the mobile terminal displays a first user interface, wherein the first user interface includes description information of the candidate processing mode. The candidate processing mode is determined as the target processing mode in response to a mode confirmation instruction, and a customized mode is determined as the target processing mode in response to a mode customization instruction.

That is, the mobile terminal displays the first user interface, wherein the first user interface includes description information of the candidate processing mode. The user determines whether the candidate processing mode needs to be determined as the target processing mode based on the description information of the candidate processing mode displayed on the first user interface, and in the case that the mobile terminal detects a confirmation operation of the user, it indicates that the user is satisfactory with the candidate processing mode recommended by the mobile terminal, and at this time, the candidate processing mode is determined as the target processing mode. In the case that the mobile terminal detects a customized operation of the user, it indicates that the user is unsatisfactory with the candidate mode recommended by the mobile terminal, and at this time, the user customizes the processing mode of the first image, and then the customized mode is determined as the target processing mode.

In the case that the mobile terminal directly determines the candidate processing mode as the target processing mode corresponding to the first image, the operation process is simplified and the operation speed is increased. In the case that the user determines whether the candidate processing mode needs to be determined as the target processing mode corresponding to the first image, a customized function is provided for the user to meet the users' usage needs in different scenarios, such that the finally-converted second image can better meet the users' needs.

The confirmation operation of the user is triggered by voice interaction or by clicking a confirmation button on the first user interface. The user's customized operation is triggered by voice interaction or by clicking a customized button on the first user interface.

The description information of the candidate processing mode includes a name of the candidate processing mode, and further includes a feature of the candidate processing mode. Alternatively, image processing parameters corresponding to the candidate processing mode are further included. The description information of the candidate processing mode further includes other information, which is not limited in the embodiments of the present disclosure.

For example, Table 1 below shows description information of a plurality of image processing modes. Assuming that the candidate processing mode is a text mode, description information of the text processing mode includes the name of the text mode, and is characterized in that characters are as clear and as free from aliasing as possible, and the adopted image processing parameters are that the contrast is improved, the color is as simple as possible, and the background is clean; the image processing parameters are that: contrast enhancement ratio=100%, sharpening ratio=100%, first color ratio=84%, second color ratio=95%, error truncation ratio=0%.

TABLE 1

| Name | Feature | Image processing parameters |
|---|---|---|
| Portrait mode | The portrait is characterized in that the skin is delicate and the face is ruddy. Therefore, the adopted image processing parameters are that the human image contrast and the human image definition are improved, the colors are fully mixed and refined, the red and white occupation ratios are high, and the error truncation is less. | Contrast enhancement ratio = 50%<br>Sharpening ratio = 70%<br>First color ratio = 84%<br>Second color ratio = 95%<br>Error truncation ratio = 100% |
| Text mode | Characters are as clear and as free from aliasing as possible, and the adopted image processing parameters are that the contrast is improved, the color is as simple as possible, and the background is clean. | Contrast enhancement ratio = 100%<br>Sharpening ratio = 100%<br>First color ratio = 84%<br>Second color ratio = 95%<br>Error truncation ratio = 0% |
| Landscape mode | The colors are fully mixed, the details of all parts are displayed, and the adopted image processing parameters ensure that all colors are as uniform as possible | Contrast enhancement ratio = 10%<br>Sharpening ratio = 20%<br>First color ratio = 84%<br>Second color ratio = 95%<br>Error truncation ratio = 100% |

In some embodiments, before the mobile terminal determines the target processing mode corresponding to the first image to be processed, the first image to be processed is edited. For example, the first image to be processed is subjected to cutting, deformation, magnification, jigsaw, text addition, LOGO addition, image position adjustment, text position adjustment, and other operations. Alternatively, the mobile terminal can also preset a plurality of image templates to edit the first image to be processed, wherein the plurality of image templates include work cards, medical bedside cards, and the like.

In step 102, based on the target processing mode, image processing parameters corresponding to the first image are determined.

Based on the above description, the target processing mode may be one of a plurality of image processing modes, or may be a customized mode, and the process of determining the image processing parameters corresponding to the first image by the mobile terminal is different in different cases. Therefore, two cases will be described separately as follows.

In the first case, in the case that the target processing mode is one of the plurality of image processing modes, the image processing parameters corresponding to the target processing mode are determined as the image processing parameters corresponding to the first image.

The plurality of image processing modes correspond to the plurality of image processing parameters in a one-to-one manner. Namely, different image processing modes correspond to different image processing parameters. Therefore, after the mobile terminal determines the target processing mode corresponding to the first image, image processing parameters corresponding to the target processing mode are selected from the plurality of image processing parameters, and the image processing parameters are determined as the image processing parameters corresponding to the first image.

In the second case, in the case that the target processing mode is the customized mode, the mobile terminal displays a second user interface, wherein the second user interface includes a plurality of customized parameter items, customized parameters input in the plurality of customized parameter items are acquired, and the customized parameters input in the plurality of customized parameter items are determined as the image processing parameters corresponding to the first image.

That is, in the case that the user chooses to determine the customized mode as the target processing mode corresponding to the first image to be processed and the mobile terminal detects a customized operation of the user, a second user interface is displayed, wherein the second user interface includes a plurality of customized parameter items, the user inputs a plurality of customized parameters on the second user interface, in the case that the mobile terminal detects a confirmation operation of the user, customized parameters input by the user in the plurality of customized parameter items are acquired, and the customized parameters input by the user in the plurality of customized parameter items are determined as the image processing parameters corresponding to the first image.

The customized parameter items may be input boxes corresponding to the image processing parameters, and the user inputs the image processing parameters in the input boxes. Alternatively, the customized parameter items may also be progress bars corresponding to the image processing parameters, and the user drags the progress bars to determine the image processing parameters.

In step 103, based on the image processing parameters and an initial pixel value of a pixel in the first image, a target pixel value of the pixel is determined from pixel values corresponding to a plurality of alternative colors.

The image processing parameters include at least one of a first color ratio, a second color ratio, a contrast enhancement ratio, a sharpening ratio, and an error truncation ratio, and further include other parameters. The first color ratio is configured to distinguish the first alternative color from other alternative colors, and the second color ratio is configured to distinguish the second alternative color from the third alternative color.

The initial pixel value of the pixel in the first image is represented by R, G, and B components in the RGB color space, and the pixel values corresponding to the plurality of alternative colors are also represented by R, G, and B components in the RGB color space. The plurality of alternative colors include a first alternative color having a hue, a second alternative color having no hue, and a third alternative color having no hue. For example, the first alternative color is red, the second alternative color is black, and the third alternative color is white. At this time, the pixel value corresponding to the first alternative color is (1, 0, 0), the pixel value corresponding to the second alternative color is (0, 0, 0), and the pixel value corresponding to the third alternative color white is (1, 1, 1).

The implementation process of the mobile terminal for determining, based on the image processing parameters and the initial pixel value of the pixel in the first image, the target pixel value of the pixel from the pixel values corresponding to the plurality of alternative colors includes: determining a distance between the initial pixel value of the pixel and the pixel value corresponding to the first alternative color, and determining, in the case the distance is smaller than a distance threshold corresponding to the first color ratio, the pixel value corresponding to the first alternative color as the target pixel value of the pixel.

The mobile terminal stores a corresponding relation between the color ratio and the distance threshold, such that the mobile terminal can acquire the distance threshold corresponding to the first color ratio from the stored corresponding relation between the color ratio and the distance threshold based on the first color ratio included in the image processing parameters.

In some embodiments, to improve the accuracy for processing the first image, the accuracy of the first color ratio may be accurate to 1%. That is, in the case that the difference between two color ratios is greater than or equal to 1%, the two color ratios correspond to different distance thresholds.

As the distance between the initial pixel value of the pixel and the pixel value corresponding to the first alternative color is configured to represent the similarity degree between the color of the pixel and the first alternative color, in the case that the distance is smaller than the distance threshold corresponding to the first color ratio, it indicates that the color of the pixel is similar to the first alternative color. Therefore, the pixel value corresponding to the first alternative color is determined as the target pixel value of the pixel.

As an example, the mobile terminal determines the distance between the initial pixel value of the pixel and the pixel value corresponding to the first alternative color according to the following formula (1).

$$d = \sqrt{(R - R_1)^2 + (G - G_1)^2 + (B - B_1)^2} \quad (1)$$

In the formula (1), d represents the distance between the initial pixel value of the pixel and the pixel value corresponding to the first alternative color, R represents an R component of the initial pixel value of the pixel, G represents a G component of the initial pixel value of the pixel, B represents a B component of the initial pixel value of the pixel, $R_1$ represents an R component of the pixel value corresponding to the first alternative color, $G_1$ represents a G component of the pixel value corresponding to the first alternative color, and $B_1$ represents a B component of the pixel value corresponding to the first alternative color.

Exemplarily, the first alternative color being red is taken as an example, at this time, the pixel value for red is (1, 0, 0). That is, the R component of the pixel value for red is 1, the G component of the pixel value for red is 0, and the B component of the pixel value for red is 0.

It should be noted that, the method in which the mobile terminal determines the distance between the initial pixel value of the pixel and the pixel value corresponding to the first alternative color according to the above formula (1) is an example. In other embodiments, the mobile terminal also determines the distance between the initial pixel value of the pixel and the pixel value corresponding to the first alternative color according to other methods.

Figure 2:
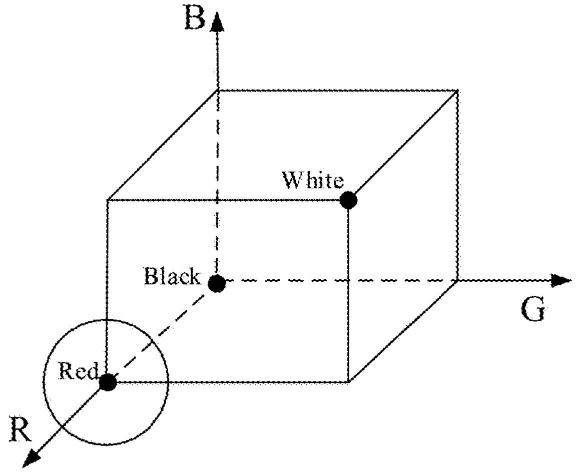
FIG. 2 is a schematic diagram of an RGB color space according to some embodiments of the present disclosure.

Exemplarily, referring to FIG. 2, FIG. 2 is a schematic diagram of an RGB color space according to some embodiments of the present disclosure. In FIG. 2, a coordinate system is established with a certain point in space as an origin, wherein coordinates for red are (1, 0, 0), coordinates for black are (0, 0, 0), and coordinates for white are (1, 1, 1). The mobile terminal draws a sphere by taking the coordinates (1, 0, 0) for red as the center of the sphere and taking the distance threshold corresponding to the first color ratio as the radius. At this time, the target pixel values of pixels whose coordinates are in the overlapping part of the sphere and the cube are the pixel values for red.

In some embodiments, the distance between the initial pixel value of the pixel and the pixel value corresponding to the first alternative color is not smaller than the distance threshold corresponding to the first color ratio. At this time, to determine the target pixel value of the pixel, the mobile terminal determines, based on the initial pixel value of the pixel, a gray-scale value of the pixel in the first image; determines, in the case that the gray-scale value is smaller than a gray-scale threshold corresponding to the second color ratio, the pixel value corresponding to the second alternative color as the target pixel value of the pixel; and determines, in the case that the gray-scale value is not smaller than the gray-scale threshold corresponding to the second color ratio, the pixel value corresponding to the third alternative color as the target pixel value of the pixel.

As an example, the mobile terminal determines the gray-scale value of the pixel in the first image according to the following formula (2).

$$V = 0.299 * R + 0.587 * G + 0.114 + B \tag{2}$$

In the formula (2), V represents the gray-scale value of the pixel in the first image, R represents an R component of the initial pixel value of the pixel, G represents a G component of the initial pixel value of the pixel, and B represents a B component of the initial pixel value of the pixel.

The mobile terminal stores a corresponding relation between the color ratio and the gray-scale threshold, such that the mobile terminal can acquire the gray-scale threshold corresponding to the second color ratio from the corresponding relation between the stored color ratio and the gray-scale threshold based on the second color ratio included in the image processing parameters.

In some embodiments, to improve the accuracy for processing the first image, the accuracy of the second color ratio may be accurate to 1%. That is, in the case that the difference between two color ratios is greater than or equal to 1%, the two color ratios correspond to different gray-scale thresholds.

As the second alternative color and the third alternative color are colors having no hues, and the gray scale of the second alternative color is smaller than that of the third alternative color, in the case that the gray-scale value of the pixel is smaller than the gray-scale threshold corresponding to the second color ratio, it indicates that the color of the pixel is similar to the second alternative color. Therefore, the pixel value corresponding to the second alternative color is determined as the target pixel value of the pixel. In the case that the gray-scale value is not smaller than the gray-scale threshold corresponding to the second color ratio, it indicates that the color of the pixel is similar to the third alternative color. Therefore, the pixel value corresponding to the third alternative color is determined as the target pixel value of the pixel.

By determining the target pixel value of the pixel in the first image from the pixel values corresponding to the plurality of alternative colors through the above method, certain boundary problems of the first image are eliminated, and then the transition of the converted second image at the boundary is more detailed. Meanwhile, as the above method only calculates the distance between the initial pixel value of the pixel and the pixel value corresponding to the first alternative color and the gray-scale value of the pixel in the first image, the operation process is greatly simplified, and the operation speed is increased.

Figure 3:
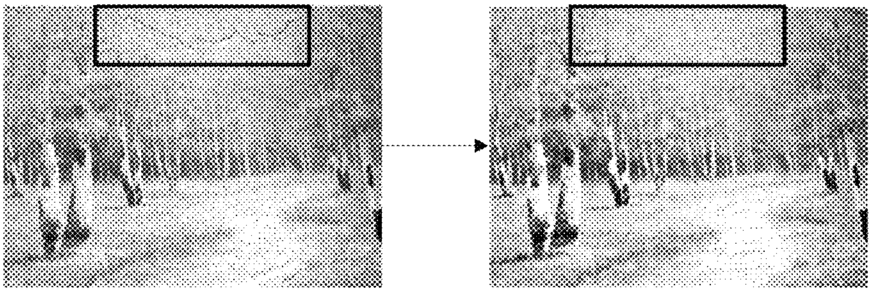
FIG. 3 is a schematic diagram of an image conversion result according to some embodiments of the present disclosure.

Exemplarily, referring to FIG. 3, FIG. 3 is a schematic diagram of an image conversion result according to some embodiments of the present disclosure. In FIG. 3, the left image is an image acquired by conversion after determining the target pixel value of each pixel in the first image by other methods, and the right image is an image acquired by conversion after determining the target pixel value of each pixel in the first image by the method provided in the present disclosure. Comparing the area corresponding to the black frame of the left image and the area corresponding to the black frame of the right image in FIG. 3, it can be seen that some boundary problems of the first image can be eliminated by determining, by the method provided in the present disclosure, the target pixel value of the pixel in the first image from the pixel values corresponding to the plurality of alternative colors.

In some embodiments, before the mobile terminal determines the target pixel value of the pixel from the pixel values corresponding to the plurality of alternative colors based on the image processing parameters and the initial pixel value of the pixel in the first image, the mobile terminal further pre-processes the first image, to improve the definition of the first image and then improve the display effect of the second image.

The preprocessing includes contrast enhancement processing and sharpening processing, and the preprocessing further includes other processing, which is not limited in the embodiments of the present disclosure. The procedure of the contrast enhancement processing and the sharpening processing on the first image is introduced as follows.

The image processing parameters further include a contrast enhancement ratio, and the mobile terminal performs contrast enhancement processing on the first image based on the contrast enhancement ratio. The implementation process of the contrast enhancement processing includes: transforming the first image from an RGB color space to an HSV color space; acquiring first brightness by determining a mean value of V components of pixels in the first image; performing, based on a gamma transformation parameter corresponding to the contrast enhancement ratio, gamma transformation on the V components of the pixels; acquiring second brightness by determining a mean value of the V components of the pixels after gamma transformation; acquiring the first image with an enhanced contrast in the HSV color space by keeping H components and S components of the pixels unchanged and adding a difference between the first brightness and the second brightness on the V components of the pixels after gamma transformation; and transforming the first image with the enhanced contrast in the HSV color space to the RGB space. In this way, the contrast, definition, and color saturation of the first image are improved and text aliasing is reduced.

The mobile terminal stores a corresponding relation between the contrast enhancement ratio and the gamma transformation parameter, such that the mobile terminal can acquire the gamma transformation parameter corresponding to the contrast enhancement ratio from the stored corresponding relation between the contrast enhancement ratio and the gamma transformation parameter based on the contrast enhancement ratio included in the image processing parameters.

Then, gamma transformation is performed on the V components of the pixels based on the gamma transformation parameter to acquire the V components of the pixels after gamma transformation.

As an example, the gamma transformation parameters include a first parameter and a second parameter. At this time, the mobile terminal performs gamma transformation on the V components of the pixels according to the following formula (3).

$$V' = CV^{\gamma} \quad (3)$$

In the formula (3), V' represents the V component of each pixel after gamma transformation, C represents the first parameter, wherein the first parameter is usually 1, V represents the V component of each pixel before gamma transformation, and y represents the second parameter, wherein the second parameter is a correction parameter. In the case that y is less than 1, an area with a low gray-scale value in the first image is stretched, and an area with a high gray-scale value is compressed. In the case that y is larger than 1, an area with a high gray-scale value in the first image is stretched, and an area with a low gray-scale value is compressed. In this way, the areas with high gray-scale values or low gray-scale values in the first image are corrected by the correction parameters, thereby enhancing the contrast of the first image.

Figure 4:
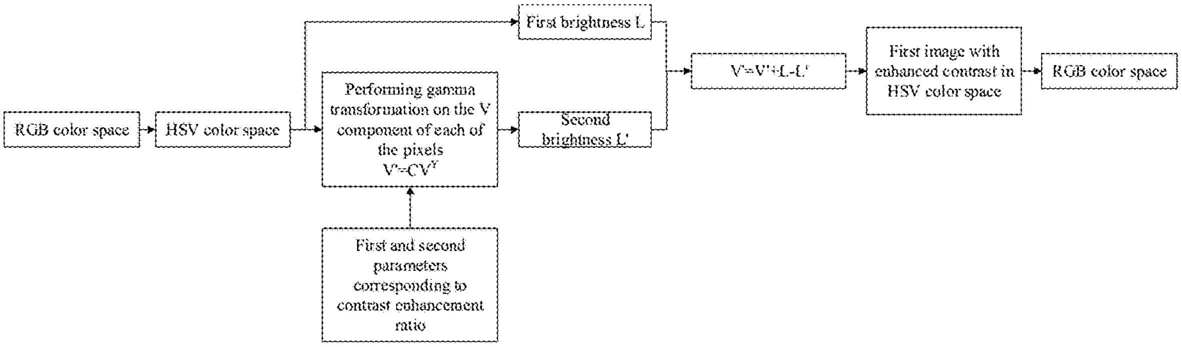
FIG. 4 is a flowchart of the process of performing contrast enhancement on a first image according to some embodiments of the present disclosure.

Exemplarily, referring to FIG. 4, FIG. 4 is a flowchart of the process of performing contrast enhancement on a first image according to some embodiments of the present disclosure. In FIG. 4, the mobile terminal transforms the first image from the RGB color space to the HSV color space and determines a mean value of the V components of the pixels in the first image to acquire the first brightness L. Gamma transformation is performed on the V components of the pixels based on the gamma transformation parameter corresponding to the contrast enhancement ratio, and the mean value of the V components of the pixels after the gamma transformation is determined to acquire the second brightness L'. Then, the H components and the S components of the pixels are kept unchanged, and the difference between the first brightness and the second brightness is added to the V component of each pixel after gamma transformation to acquire the first image with an enhanced contrast in the HSV color space, and then the first image with the enhanced contrast in the HSV color space is transformed to the RGB space.

The image processing parameters further include a sharpening ratio, and the mobile terminal performs sharpening processing on the first image based on the sharpening ratio. The implementation process for sharpening processing includes: acquiring a brightness channel map by transforming the first image from an RGB color space to an HSV color space; acquiring a first filtered map by performing, based on the sharpening ratio, guided filtering on the brightness channel map; acquiring a first detail map by separating the first filtered map from the brightness channel map; acquiring a first enhancement map by superposing the first detail map onto the brightness channel map; acquiring a second filtered map by performing, based on the sharpening ratio, Gaussian filtering on the first enhancement map; acquiring a second detail map by separating the second filtered map from the first enhancement map; acquiring a second enhancement map by superposing the second detail map onto the first enhancement map; and acquiring a sharpened first image by transforming the second enhancement map from the HSV color space to the RGB color space. In this way, the contrast, definition, and color saturation of the boundary of the first image are improved.

In some embodiments, the above sharpening ratio corresponds to a first filtering parameter and a second filtering parameter. At this time, the mobile terminal performs guided filtering on the brightness channel map according to a related algorithm based on the first filtering parameter to acquire a first filtered map. Meanwhile, Gaussian filtering is performed on the first enhancement map according to a related algorithm based on the second filtering parameter to acquire a second filtered map.

In some embodiments, the above sharpening ratio further corresponds to a sharpening degree. In this way, the mobile terminal further performs detail enhancement on the first detail map and the second detail map according to a related algorithm based on the sharpening degree, superimposes the detail-enhanced first detail map onto the brightness channel map to acquire a first enhancement map, and superimposes the detail-enhanced second detail map onto the first enhancement map to acquire a second enhancement map. The sharpening degree is configured to indicate the strength of sharpening the first image, and the larger the numerical value is, the higher the strength of sharpening the first image is.

It should be noted that, the mobile terminal stores corresponding relations among different sharpening ratios, the filtering parameters, and the sharpening degrees. Therefore, after the image processing parameters corresponding to the first image are determined, the corresponding first filtering parameter, second filtering parameter, and sharpening degree are acquired from the corresponding relations based on the sharpening ratio included in the image processing parameters.

Figure 5:
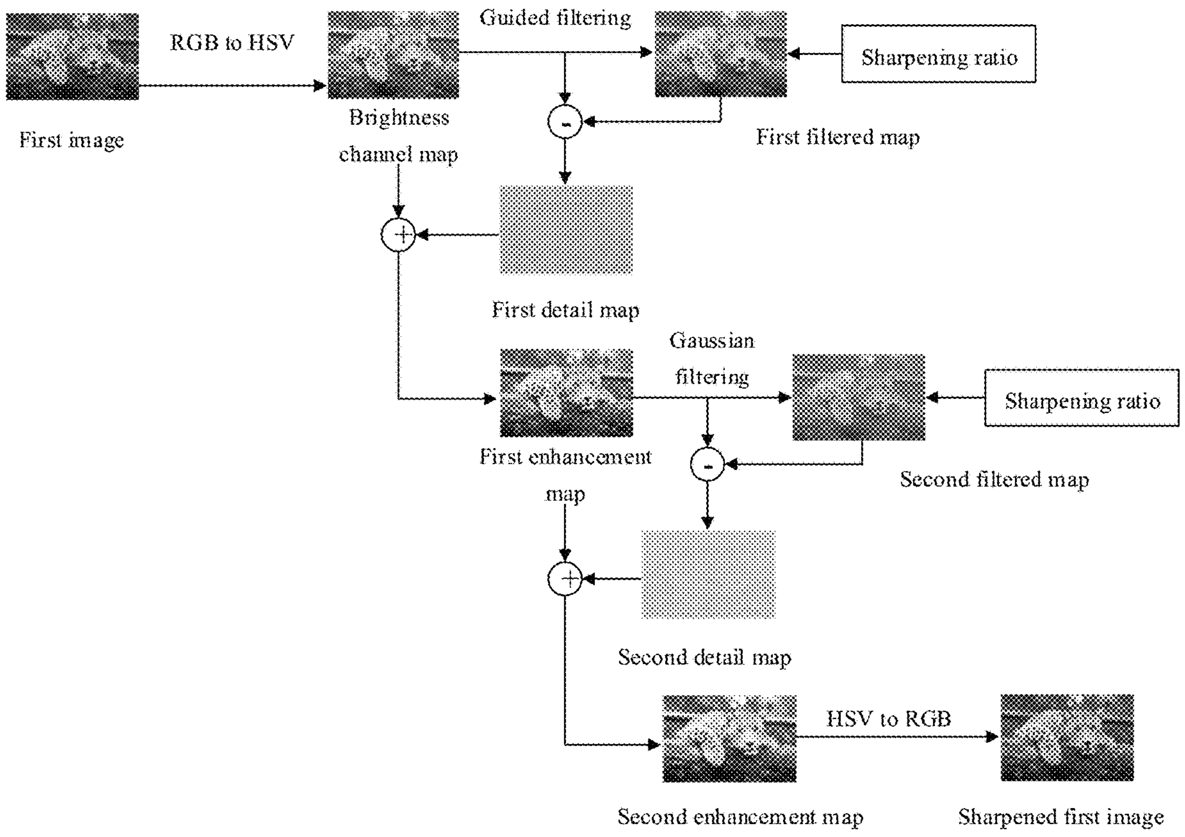
FIG. 5 is a flowchart of the process of performing sharpening on the first image according to some embodiments of the present disclosure.

Exemplarily, referring to FIG. 5, FIG. 5 is a flowchart of the process of performing sharpening processing on a first image according to some embodiments of the present disclosure. In FIG. 5, the mobile terminal transforms the first image from an RGB color space to an HSV color space to acquire a brightness channel map, performs guided filtering on the brightness channel map based on the sharpening ratio to acquire a first filtered map, separates the first filtered map from the brightness channel map to acquire a first detail map, and superposes the first detail map onto the brightness channel map to acquire a first enhancement map. Then, based on the sharpening ratio, Gaussian filtering is performed on the first enhancement map to acquire a second filtered map, the second filtered map is separated from the first enhancement map to acquire a second detail map, and the second detail map is superposed onto the first enhancement map to acquire a second enhancement map. Finally, the second enhancement map is transformed from the HSV color space to the RGB color space to acquire a sharpened first image.

Figure 6:
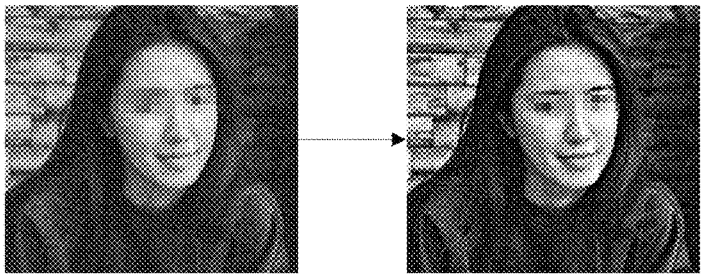
FIG. 6 is a schematic diagram of an image preprocessing effect according to some embodiments of the present disclosure.

Based on the above description, preprocessing the first image can improve the contrast, definition, and color saturation of the first image and reduce the text aliasing. For example, referring to FIG. 6, FIG. 6 is a schematic diagram of an image preprocessing effect according to some embodiments of the present disclosure. In FIG. 6, the left image is the first image before the preprocessing, and the right image is the first image after the preprocessing.

In step 104, a second image is acquired by converting the initial pixel value of the pixel in the first image into the target pixel value.

In the case that the image processing parameters further include an error truncation ratio, before the mobile terminal converts the initial pixel value of the pixel in the first image into the target pixel value, error diffusion is also performed on the target pixel value, thereby reducing background mottle. Namely, the mobile terminal determines a difference between an initial pixel value and a target pixel value of the pixel in the first image to acquire an error value, and performs error diffusion on the target pixel value based on the error value and an error truncation ratio.

As an example, the mobile terminal determines the difference between the initial pixel value of the pixel and the target pixel value of the pixel according to the following formula (4).

$$Error(R, G, B) = SRC(R, G, B) - DST(R, G, B) \tag{4}$$

In the formula (4), Error(R, G, B) represents a difference, i.e., an error value, between the initial pixel value of the pixel and the target pixel value of the pixel, SRC(R, G, B) represents the initial pixel value of the pixel, and DST(R, G, B) represents the target pixel value of the pixel.

In some embodiments, the implementation process of the mobile terminal performing error diffusion on the target pixel value based on the error value and the error truncation ratio includes: determining, based on the error value and the error truncation ratio, a difference between the initial pixel value of the pixel and the target pixel value of the pixel after error truncation, i.e., an error value after error truncation; and then, performing, based on the error value after error truncation, error diffusion on the pixel.

As an example, the mobile terminal determines the error value after the error truncation according to the following formula (5).

$$Error(R, G, B)' = floor(Error(R, G, B) * Norm)/Norm \tag{5}$$

In the formula (5), Error(R, G, B)' represents the difference between the initial pixel value of the pixel and the target pixel value of the pixel after error truncation, i.e., the error value after error truncation, floor represents a floor function, Error(R, G, B) represents the difference between the initial pixel value of the pixel and the target pixel value of the pixel before error truncation, and Norm represents an error truncation value corresponding to the error truncation ratio, wherein the error truncation value is a positive integer.

In some embodiments, the mobile terminal stores a corresponding relation between the error truncation ratio and the error truncation value. Therefore, the mobile terminal can acquire, based on the error truncation ratio included in the image processing parameters, an error truncation value corresponding to the error truncation ratio from the stored corresponding relation between the error truncation ratio and the error truncation value. Then, an error value after error truncation is determined according to the above method based on the error value of the pixel and the error truncation value.

The error truncation value is configured to indicate the strength of error truncation on the pixel, and the smaller the error truncation value is, the larger the truncation strength is. The error truncation value ranges from 40 to 128 according to experience, which can effectively reduce the color dithering in the first image, improve the granular sensation of the converted second image, and improve the color saturation.

After the error value after the error truncation is determined, the mobile terminal determines an error diffusion window corresponding to the pixel, wherein the error diffusion window corresponding to the pixel is a window with the pixel as a center, and the error diffusion window further includes other pixels located in a neighborhood of the pixel. For ease of description, the pixel is referred to as pixel A, other pixels in the error diffusion window are referred to as pixels B, and for any pixel B in the error diffusion window for which a target pixel value is not determined, the mobile terminal acquires an error diffusion ratio corresponding to the pixel B. Then, the error value after the error truncation is multiplied by the error diffusion ratio corresponding to the pixel B to acquire a current error diffusion value of the pixel B, and the current error diffusion value of the pixel B and the pixel value of the pixel B before the current error diffusion are added to complete the error diffusion from the pixel A to the pixel B. That is, the mobile terminal allocates the error value of pixel A after the error truncation to other pixels in the error diffusion window for which the target pixel values are not determined. In this way, the boundary of the first image is enhanced, thereby improving the display effect of the processed second image.

The error diffusion window may be a 3×3 window, and may also be a 5×5 window. The error diffusion window may also be a window with other sizes, which is not limited in the embodiments of the present disclosure. The error diffusion ratios corresponding to other pixels in the error diffusion window are preset. Moreover, the error diffusion ratios corresponding to other pixels are stored in a table form or a matrix form. The error diffusion ratios corresponding to other pixels are also stored in other forms, which is not limited in the embodiments of the present disclosure.

It should be noted that, for any one of the other pixels in the error diffusion window, before the mobile terminal determines the target pixel value of the pixel, the case that a plurality of pixels need to perform error diffusion on the pixel is present. In this case, the mobile terminal superimposes, based on the initial pixel value of the pixel, an error diffusion value of each pixel in the plurality of pixels for performing error diffusion on the pixel. Then, based on the image processing parameters and the pixel value of the pixel acquired after each error diffusion value is superposed, the target pixel value of the pixel is determined from the pixel values corresponding to the plurality of alternative colors.

For example, a window that is an error diffusion window of 5×5 determined by the mobile terminal is taken as an example. Table 2 below shows the error diffusion ratios corresponding to other pixels for which the target pixel values are not determined in the error diffusion window of 5×5 with pixel A as a center. Assuming that the mobile terminal needs to diffuse the error value Error' of pixel A after the error truncation to the surrounding pixel B, pixel C, pixel D, pixel E, pixel F, pixel G, pixel H, pixel I, pixel J, pixel K, pixel L, and pixel M. For pixel B, the mobile terminal multiplies the error diffusion ratio 7/48 corresponding to pixel B by the error value Error' of pixel A after error truncation to acquire a current error diffusion value Error'*7/48 of pixel B, and adds the current error diffusion value Error'*7/48 of pixel B to the pixel value of pixel B before the current error diffusion to acquire the pixel value of pixel B after the current error diffusion.

TABLE 2

| | | | | |
|---|---|---|---|---|
| | | A | B | C |
| | | Error' | $\frac{7}{48}$ | $\frac{5}{48}$ |
| D | E | F | G | H |
| $\frac{3}{48}$ | $\frac{5}{48}$ | $\frac{7}{48}$ | $\frac{5}{48}$ | $\frac{3}{48}$ |
| I | J | K | L | M |
| $\frac{1}{48}$ | $\frac{3}{48}$ | $\frac{5}{48}$ | $\frac{3}{48}$ | $\frac{1}{48}$ |

Figure 7:
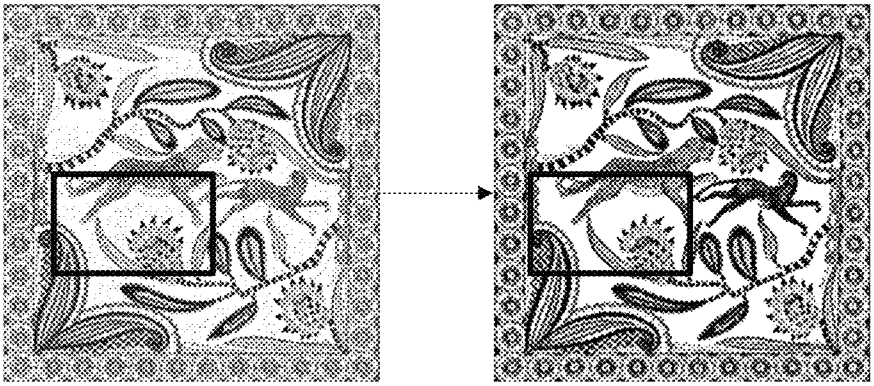
FIG. 7 is a schematic diagram of an error diffusion effect according to some embodiments of the present disclosure.

Exemplarily, referring to FIG. 7, FIG. 7 is a schematic diagram of an error diffusion effect according to some embodiments of the present disclosure. In FIG. 7, the left image is the first image before error diffusion, and the right image is the first image after error diffusion. Comparing the area corresponding to the black frame of the left image with the area corresponding to the black frame of the right image in FIG. 7, it can be seen that the background mottle is reduced by error diffusion.

The pixels in the first image in the steps 102 to 104 refer to all pixels in the first image, and also refer to some of the pixels in the first image. That is, the mobile terminal converts the initial pixel values of all the pixels in the first image into the target pixel values, or only converts the initial pixel values of some of the pixels in the first image into the target pixel values. In the case that the mobile terminal converts the initial pixel values of all the pixels in the first image into the target pixel values, the initial pixel values of all the pixels in the first image are sequentially converted according to the steps 102 to 104. At this time, after the mobile terminal traverses each pixel, the initial pixel value of the pixel needs to be converted into the target pixel value. Then, it is determined whether the traversal of all the pixels in the first image is ended, and in the case that the traversal of all the pixels in the first image is finished, a second image is output. In the case that all the pixels in the first image are not traversed, the target pixel values of other pixels not traversed in the first image are determined continuously according to the steps 102 to 104 until all the pixels in the first image are traversed, and then the second image is output. Exemplarily, in the case that the next pixel adjacent to the current pixel does not have an initial pixel value, it indicates that the current pixel is the last pixel in the first image to be processed. That is, the traversal of the first image is ended, and the mobile terminal outputs the second image.

In case that the traversal of the first image is ended, the mobile terminal directly outputs the second image. At this time, the mobile terminal displays the second image. In some embodiments, as the second image output by the mobile terminal does not meet the users' usage needs, the mobile terminal displays a third user interface that includes the second image. The user previews the second image in the third user interface, to determine whether the second image meets the users' usage needs. In the case that the second image meets the users' usage needs, the mobile terminal displays the second image. In the case that the second image does not meet the users' usage needs, the mobile terminal reprocesses the first image according to the steps 101 to 104 until the second image meets the users' usage needs, and then displays the second image. That is, the mobile terminal displays the third user interface that includes the second image. The user previews the second image in the third user interface, in the case that the mobile terminal detects a confirmation operation of the user, it indicates that the second image meets the users' usage needs, and at this time, the mobile terminal displays the second image. In the case that the mobile terminal detects a reprocessing operation of the user, it indicates that the second image does not meet the users' usage needs, and at this time, the mobile terminal reprocesses the first image according to the steps 101 to 104 until the second image meets the users' usage needs, and then displays the second image.

In some embodiments, after the mobile terminal acquires the second image, the second image is further sent to another device via near-field communication (NFC), Bluetooth communication, or the like, and the other device receives the second image and displays the second image.

The first image is a partial area in the original color image, such as a portrait area, a text area, or a landscape area. The mobile terminal processes at least two different first images according to the steps 101 to 104 to acquire at least two different second images. Thereafter, the mobile terminal displays a third user interface including the at least two different second images.

That is, the mobile terminal converts at least two different first images in the original color image, respectively, to acquire at least two different second images. Then, the at least two different second images are stitched to acquire a third image, and the third image is displayed on the third user interface.

In the embodiments of the present disclosure, as different first images correspond to different target processing modes, and the different target processing modes correspond to different image processing parameters, image processing parameters corresponding to a first image to be processed are associated with the first image. In this way, the first image is converted into a second image based on the image processing parameters associated with the first image, such that the accuracy of image processing is improved, and the display effect of the second image is further improved, thereby clearly reflecting visual information of the first image by the second image. Meanwhile, different target processing modes can meet the users' usage needs in different scenarios. In addition, the contrast, definition, and color saturation of the first image are improved and the text aliasing is reduced by performing contrast enhancement processing on the first image.

The contrast, definition, and color saturation of the boundary of the first image are improved by performing sharpening processing on the first image. The background mottle is reduced and the display effect of the second image is further improved by performing error diffusion on the target pixel value.

Figure 8:
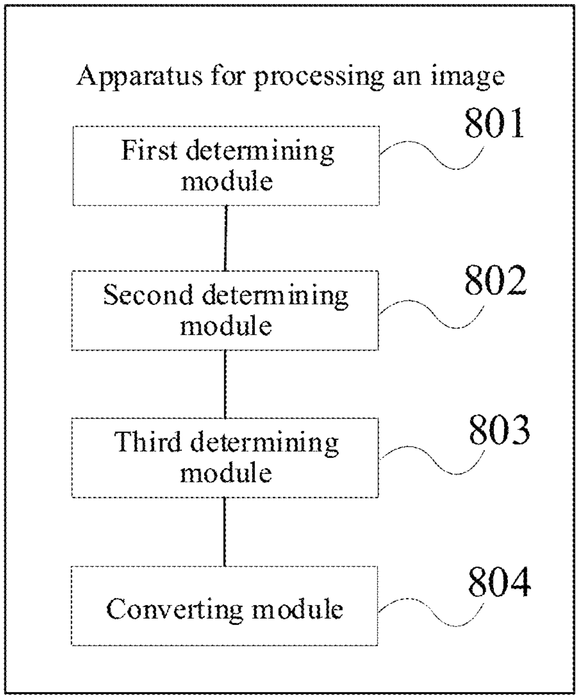
FIG. 8 is a schematic structural diagram of an apparatus for processing an image according to some embodiments of the present disclosure.

FIG. 8 is a schematic structural diagram of an apparatus for processing an image according to some embodiments of the present disclosure. The apparatus for processing the image is implemented by software, hardware, or a combination of the two to become part of or all of a device for processing an image. Referring to FIG. 8, the apparatus includes: a first determining module 801, a second determining module 802, a third determining module 803, and a converting module 804.

The first determining module 801 is configured to determine a target processing mode corresponding to a first image to be processed;

the second determining module 802 is configured to determine, based on the target processing mode, image processing parameters corresponding to the first image;

the third determining module 803 is configured to determine, based on the image processing parameters and an initial pixel value of a pixel in the first image, a target pixel value of the pixel from pixel values corresponding to a plurality of alternative colors; and the converting module 804 is configured to acquire a second image by converting the initial pixel value of the pixel in the first image into the target pixel value.

In some embodiments, the first determining module 801 includes:

a first identifying unit, configured to acquire an identification result by identifying a type of an object in the first image;

a first determining unit, configured to determine, in a case that the identification result includes one object type and the object type is a first object type, an image processing mode corresponding to the first object type in a plurality of image processing modes as a candidate processing mode corresponding to the first image; and a second determining unit, configured to determine, based on the candidate processing mode, the target processing mode.

In some embodiments, the first determining module 801 includes:

a second identifying unit, configured to acquire an identification result by identifying a type of an object in the first image;

a third determining unit, configured to determine, in a case that the identification result includes a plurality of object types, area ratios of imaging areas of objects respectively corresponding to the plurality of object types in the first image;

a fourth determining unit, configured to determine an image processing mode corresponding to a second object type in the plurality of image processing modes as a candidate processing mode corresponding to the first image, wherein the second object type is an object type with a largest area ratio in the plurality of object types; and a fifth determining unit, configured to determine, based on the candidate processing mode, the target processing mode.

In some embodiments, the second determining unit or the fifth determining unit is specifically configured to:

display a first user interface, wherein the first user interface includes description information of the candidate processing mode;

determine, in response to a mode confirmation instruction, the candidate processing mode as the target processing mode; and determine, in response to a mode customization instruction, a customized mode as the target processing mode.

In some embodiments, the second determining module 802 is specifically configured to:

determine, in a case that the target processing mode is one of a plurality of image processing modes, image processing parameters corresponding to the target processing mode as the image processing parameters corresponding to the first image.

In some embodiments, the second determining module 802 is specifically configured to:

display, in a case that the target processing mode is a customized mode, a second user interface, wherein the second user interface includes a plurality of customized parameter items;

acquire customized parameters input in the plurality of customized parameter items; and determine the customized parameters input in the plurality of customized parameter items as the image processing parameters corresponding to the first image.

In some embodiments, the plurality of alternative colors include a first alternative color having a hue, and the image processing parameters include a first color ratio, wherein the first color ratio is configured to distinguish the first alternative color from other alternative colors; and the third determining module 803 is specifically configured to:

determine a distance between the initial pixel value of the pixel and a pixel value corresponding to the first alternative color; and determine, in a case that the distance is smaller than a distance threshold corresponding to the first color ratio, the pixel value corresponding to the first alternative color as the target pixel value of the pixel.

In some embodiments, the plurality of alternative colors further include a second alternative color having no hue and a third alternative color having no hue, a gray scale of the second alternative color being smaller than a gray scale of the third alternative color, and the image processing parameters further include a second color ratio, the second color ratio being configured to distinguish the second alternative color from the third alternative color; and the third determining module 803 is further specifically configured to:

determine, in response to the distance being not smaller than a distance threshold corresponding to the first color ratio, a gray-scale value of the pixel in the first image based on the initial pixel value; and determine the target pixel value of the pixel based on the gray-scale value; wherein, determine, in a case that the gray-scale value is smaller than a gray-scale threshold corresponding to the second color ratio, a pixel value corresponding to the second alternative color as the target pixel value of the pixel; and determine, in a case that the gray-scale value is not smaller than the gray-scale threshold corresponding to the second color ratio, a pixel value corresponding to the third alternative color as the target pixel value of the pixel.

In some embodiments, the image processing parameters further include a contrast enhancement ratio; and the apparatus further includes:

a contrast enhancement processing module, configured to perform, based on the contrast enhancement ratio, contrast enhancement processing on the first image.

In some embodiments, the contrast enhancement processing module is specifically configured to:

transform the first image from an RGB color space to an HSV color space;

acquire first brightness by determining a mean value of V components of pixels in the first image;

perform, based on a gamma transformation parameter corresponding to the contrast enhancement ratio, gamma transformation on the V component of each of the pixels;

acquire second brightness by determining a mean value of the V components of the pixels after gamma transformation;

acquire the first image with an enhanced contrast in the HSV color space by keeping H components and S components of the pixels unchanged, and add a difference between the first brightness and the second brightness on the V components of the pixels after gamma transformation; and acquire the first image with an enhanced contrast by transforming the first image with the enhanced contrast in the HSV color space to the RGB space.

In some embodiments, the image processing parameters further include a sharpening ratio; and the apparatus further includes:

a sharpening processing module, configured to perform, based on the sharpening ratio, sharpening processing on the first image.

In some embodiments, the sharpening processing module is specifically configured to:

acquire a brightness channel map by transforming the first image from an RGB color space to an HSV color space;

acquire a first filtered map by performing, based on the sharpening ratio, guided filtering on the brightness channel map;

acquire a first detail map by separating the first filtered map from the brightness channel map;

acquire a first enhancement map by superposing the first detail map onto the brightness channel map;

acquire a second filtered map by performing, based on the sharpening ratio, Gaussian filtering on the first enhancement map;

acquire a second detail map by separating the second filtered map from the first enhancement map;

acquire a second enhancement map by superposing the second detail map onto the first enhancement map; and acquire a sharpened first image by transforming the second enhancement map from the HSV color space to the RGB color space.

In some embodiments, the image processing parameters further include an error truncation ratio; and the apparatus further includes:

a fourth determining module, configured to acquire an error value by determining a difference between the initial pixel value and the target pixel value; and an error diffusion module, configured to perform, based on the error value and the error truncation ratio, error diffusion on the target pixel value.

In some embodiments, the apparatus further includes:

a display module, configured to display a third user interface, wherein the third user interface includes a third image, the third image including at least two different second images converted from the first image.

In some embodiments of the present disclosure, as different first images correspond to different target processing modes, and different target processing modes correspond to different image processing parameters, image processing parameters corresponding to a first image to be processed are associated with the first image. In this way, the first image is converted into a second image based on the image processing parameters associated with the first image, such that the accuracy of image processing is improved, and the display effect of the second image is further improved, thereby clearly reflecting visual information of the first image by the second image. Meanwhile, different target processing modes can meet the users' usage needs in different scenarios. In addition, the contrast, definition and color saturation of the first image are improved and the text aliasing is reduced by performing contrast enhancement processing on the first image.

The contrast, definition and color saturation of the boundary of the first image are improved by performing sharpening processing on the first image. The background mottle is reduced and the display effect of the second image is further improved by performing error diffusion on the target pixel value.

It should be noted that, in the case that the apparatus for processing the image according to the above embodiments performs image processing, the division of the functional modules is merely exemplary. In practice, the above functions can be assigned to different functional modules according to needs, that is, the internal structure of the apparatus is divided into different functional modules, to implement all or a part of the above functions. In addition, the apparatus and the method for processing the image according to the above embodiments belong to the same concept, and specific implementation processes thereof are described in the method embodiments in detail, and are not repeated herein.

Figure 9:
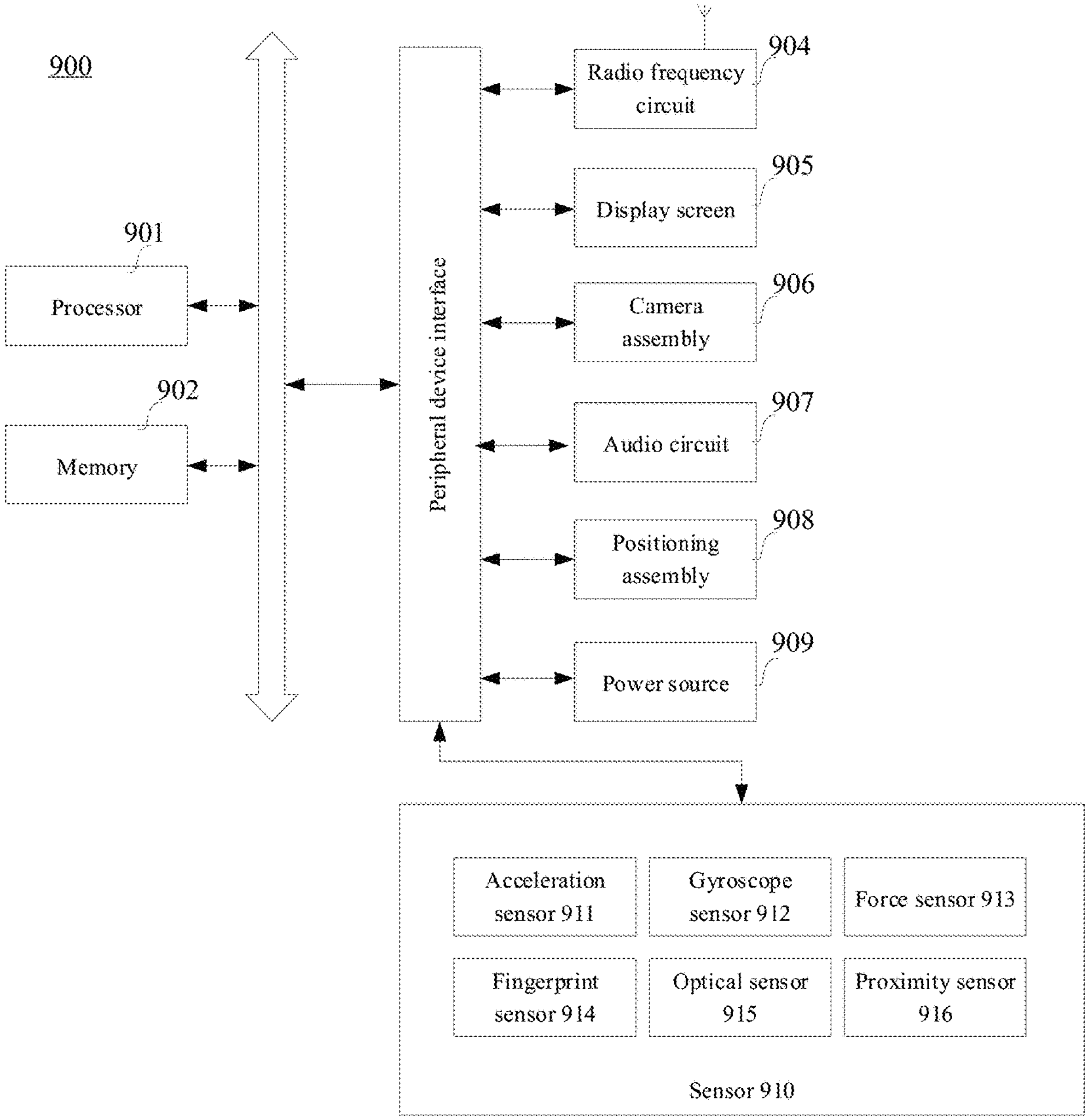
FIG. 9 is a schematic structural diagram of a mobile terminal according to some embodiments of the present disclosure.

FIG. 9 shows a structural block diagram of a mobile terminal 900 according to some embodiments of the present disclosure. The mobile terminal 900 may be a portable mobile terminal, such as a smartphone, a tablet computer, a moving picture experts group audio layer III (MP3) player, a moving picture experts group audio layer IV (MP4) player, a notebook computer, or a desktop computer. The mobile terminal 900 is also referred to as user equipment, a portable terminal, a laptop terminal, a desktop terminal, or the like.

Generally, the mobile terminal 900 includes a processor 901 and a memory 902.

The processor 901 includes one or more processing cores, such as a 4-core processor and an 8-core processor. The processor 901 is implemented by at least one of hardware forms of a digital signal processor (DSP), a field-programmable gate array (FPGA), and a programmable logic array (PLA). The processor 901 also includes a main processor and a coprocessor. The main processor is a processor for processing data in an awake state, and is also referred to as a central processing unit (CPU). The coprocessor is a low-power-consumption processor for processing the data in a standby state. In some embodiments, the processor 901 is integrated with a graphics processing unit (GPU), which is configured to render and draw the content that needs to be displayed on a display screen. In some embodiments, the processor 901 further includes an artificial intelligence (AI) processor for processing computational operations related to machine learning.

The memory 902 includes one or more computer-readable storage media, which is non-transitory. The memory 902 further includes a high-speed random access memory, as well as a non-volatile memory, such as one or more magnetic disk storage devices and flash storage devices. In some embodiments, a non-transitory computer-readable storage medium in the memory 902 is configured to store at least one instruction. The at least one instruction is configured to be executed by the processor 901 to perform the method for processing the image in the embodiments of the present disclosure.

In some embodiments, the mobile terminal 900 further optionally includes a peripheral device interface 903 and at least one peripheral device. The processor 901, the memory 902, and the peripheral device interface 903 are connected via buses or signal lines. Each peripheral device is connected to the peripheral device interface 903 via a bus, signal line, or a circuit board. In some embodiments, the peripheral devices include at least one of a radio frequency circuit 904, a display screen 905, a camera assembly 906, an audio circuit 907, a positioning assembly 908, and a power source 909.

The peripheral device interface 903 is configured to connect at least one peripheral device associated with an input/output (I/O) to the processor 901 and the memory 902. In some embodiments, the processor 901, the memory 902, and the peripheral device interface 903 are integrated on the same chip or circuit board. In some other embodiments, any one or two of the processor 901, the memory 902, and the peripheral device interface 903 are implemented on a separate chip or circuit board, which is not limited in the embodiments of the present disclosure.

The radio frequency circuit 904 is configured to receive and transmit a radio frequency (RF) signal, which is also referred to as an electromagnetic signal. The radio frequency circuit 904 is communicated with a communication network and other communication devices via electromagnetic signals. The radio frequency circuit 904 converts an electrical signal into an electromagnetic signal for transmission or converts the received electromagnetic signal into an electrical signal. In some embodiments, the radio frequency circuit 904 includes an antenna system, an RF transceiver, one or more amplifiers, a tuner, an oscillator, a digital signal processor, a coder/decoder (codec) chipset, a subscriber identity module card, and the like. The radio frequency circuit 904 is communicated with other terminals via at least one wireless communication protocol. The wireless communication protocol includes, but is not limited to, a WWW network, a metropolitan area network, an intranet, various generations of mobile communication networks (2G, 3G, 4G, and 5G), a wireless local area network, and/or a wireless fidelity (Wi-Fi) network. In some embodiments, the radio frequency circuit 904 further includes a near field communication (NFC) related circuit, which is not limited in the embodiments of the present disclosure.

The display screen 905 is configured to display a user interface (UI). The UI includes graphics, text, icons, videos, and any combination thereof. In the case that the display screen 905 is a touch display screen, the display screen 905 also has the capacity to acquire a touch signal on or over a surface of the display screen 905. The touch signal is input to the processor 901 as a control signal for processing. In this case, the display screen 905 is also configured to provide virtual buttons and/or virtual keyboards, which are also referred to as soft buttons and/or soft keyboards. In some embodiments, there is one display screen 905 disposed on a front panel of the mobile terminal 900; in some other embodiments, there are at least two display screens 905 disposed on different surfaces of the mobile terminal 900 respectively or in a folded design. In some other embodiments, the display screen 905 is a flexible display screen disposed on a curved surface or a folded surface of the mobile terminal 900. Moreover, the display screen 905 may have an irregular shape other than a rectangle, that is, an irregular-shaped screen. The display screen 905 is prepared by using a material such as a liquid crystal display (LCD) or an organic light-emitting diode (OLED).

The camera assembly 906 is configured to capture images or videos. Optionally, the camera assembly 906 includes a front camera and a rear camera. Generally, the front camera is disposed on the front panel of the terminal and the rear camera is disposed on a back side of the terminal. In some embodiments, there are at least two rear cameras, and each of the at least two rear cameras is any one of a main camera, a depth-of-field camera, a wide-angle camera, and a telephoto camera, to realize a background blurring function realized by fusion of the main camera and the depth-of-field camera, panoramic shooting and virtual reality (VR) shooting functions by fusion of the main camera and the wide-angle camera, or other fusion shooting functions. In some embodiments, the camera assembly 906 further includes a flashlight. The flashlight is a mono-color temperature flashlight or a two-color temperature flashlight. The two-color temperature flashlight is a combination of a warm flashlight and a cold flashlight, and can be used for light compensation at different color temperatures.

The audio circuit 907 includes a microphone and a loudspeaker. The microphone is configured to acquire sound waves of users and the environment, and convert the sound waves into electrical signals which are input into the processor 901 for processing, or input into the radio frequency circuit 904 for voice communication. For stereo acquisition or noise reduction, there are a plurality of microphones, which are respectively disposed at different parts of the mobile terminal 900. The microphone is also an array microphone or an omnidirectional acquisition microphone. The loudspeaker is configured to convert the electrical signal from the processor 901 or the radio frequency circuit 904 into the sound waves. The loudspeaker is a conventional film loudspeaker or a piezoelectric ceramic loudspeaker. In the case that the loudspeaker is a piezoelectric ceramic speaker, the electrical signals can be converted into not only human-audible sound waves but also the sound waves which are inaudible to humans for ranging and the like. In some embodiments, the audio circuit 907 further includes a headphone jack.

The positioning assembly 908 is configured to position a current geographic location of the mobile terminal 900 to implement navigation or a location-based service (LBS). The positioning assembly 908 may be the United States' Global Positioning System (GPS), Russia's Global Navigation Satellite System (GLONASS), China's BeiDou Navigation Satellite System (BDS), and the European Union's Galileo Satellite Navigation System (Galileo).

The power source 909 is configured to supply power for various components in the mobile terminal 900. The power source 909 is an alternating current, a direct current, a disposable battery, or a rechargeable battery. In the case that the power source 909 includes a rechargeable battery, the rechargeable battery is a wired charging battery or a wireless charging battery. The wired charging battery is a battery that is charged through a wired line, and a wireless charging battery is a battery that is charged through a wireless coil. The rechargeable battery also supports the fast-charging technology.

In some embodiments, the mobile terminal 900 further includes one or more sensors 910. The one or more sensors 910 include, but are not limited to, an acceleration sensor 911, a gyroscope sensor 912, a force sensor 913, a fingerprint sensor 914, an optical sensor 915, and a proximity sensor 916.

The acceleration sensor 911 is configured to detect magnitudes of accelerations on three coordinate axes of a coordinate system established by the mobile terminal 900. For example, the acceleration sensor 911 is configured to detect components of gravitational acceleration on the three coordinate axes. The processor 901 controls the display screen 905 to display a user interface in a landscape view or a portrait view according to a gravity acceleration signal acquired by the acceleration sensor 911. The acceleration sensor 911 is also configured to acquire motion data of a game or a user.

The gyroscope sensor 912 is configured to detect a body direction and a rotation angle of the mobile terminal 900, and cooperates with the acceleration sensor 911 to acquire a 3D motion of the user on the mobile terminal 900. Based on the data acquired by the gyroscope sensor 912, the processor 901 achieves the following functions: motion sensing (for example, changing the UI according to a user's tilting operation), image stabilization during shooting, game control, and inertial navigation.

The force sensor 913 is disposed at a side frame of the mobile terminal 900 and/or a lower layer of the display screen 905. In the case that the force sensor 913 is disposed on the side frame of the mobile terminal 900, a user's holding signal to the mobile terminal 900 can be detected, and the processor 901 can perform left-right hand recognition or quick operation according to the holding signal acquired by the force sensor 913. In the case that the force sensor 913 is disposed on the lower layer of the display screen 905, the processor 901 controls an operability control on the UI based on a user's press operation on the display screen 905. The operability control includes at least one of a button control, a scroll bar control, an icon control, and a menu control.

The fingerprint sensor 914 is configured to acquire a user's fingerprint, and the processor 901 identifies the user's identity based on the fingerprint acquired by the fingerprint sensor 914, or the fingerprint sensor 914 identifies the user's identity based on the acquired fingerprint. In the case that the user's identity is identified as trusted, the processor 901 authorizes the user to perform related sensitive operations, such as unlocking the screen, viewing encrypted information, downloading software, paying, and changing settings. The fingerprint sensor 914 is disposed on the front side, back side, or side surface of the mobile terminal 900. In the case that the mobile terminal 900 is provided with a physical key or a manufacturer's logo, the fingerprint sensor 914 is integrated with the physical key or the manufacturer's logo.

The optical sensor 915 is configured to acquire ambient light intensity. In some embodiments, the processor 901 controls the display brightness of the display screen 905 based on the ambient light intensity acquired by the optical sensor 915. In some embodiments, in the case that the ambient light intensity is relatively high, the display brightness of the display screen 905 is increased; and in the case that the ambient light intensity is relatively low, the display brightness of the display screen 905 is decreased. In another embodiment, the processor 901 also dynamically adjusts the shooting parameters of the camera assembly 906 based on the ambient light intensity acquired by the optical sensor 915.

The proximity sensor 916, also referred to as a distance sensor, is usually disposed on the front panel of the mobile terminal 900. The proximity sensor 916 is configured to acquire a distance between the user and a front side of the mobile terminal 900. In some embodiments, in the case that the proximity sensor 916 detects that the distance between the user and the front side of the mobile terminal 900 gradually decreases, the processor 901 controls the display screen 905 to switch from a screen-on state to a screen-off state; and in the case that the proximity sensor 916 detects that the distance between the user and the front side of the mobile terminal 900 gradually increases, the processor 901 controls the display screen 905 to switch from the screen-off state into the screen-on state.

Those skilled in the art can appreciate that the structure illustrated in FIG. 9 does not constitute a limitation of the mobile terminal 900, and that more or fewer components than those illustrated are included, or some of the components are combined, or a different arrangement of components is employed.

In some embodiments, a non-transitory computer-readable storage medium having a computer program stored herein is further provided. The computer program, when executed by a processor, causes the processor to perform the steps of the method for processing the image in the above embodiments. For example, the computer-readable storage medium is a ROM, a RAM, a CD-ROM, a magnetic tape, a soft disk, an optical data storage device, and the like.

It is noted that the computer-readable storage medium mentioned according to the embodiments of the present disclosure is a non-volatile storage medium, in other words, a non-transitory storage medium.

It should be understood that all or part of the steps to achieve the above embodiments are achieved by software, hardware, firmware, or any combination thereof. In the case that it is achieved in software, it is achieved in whole or in part in the form of a computer program product. The computer program product includes one or more computer instructions. The computer instructions are stored in the above computer-readable storage medium.

That is, in some embodiments, a computer program product including one or more instructions is further provided. The instructions, when executed by a computer, cause the computer to perform the steps of the method for processing the image described above.

It is understood that the term "at least one" refers to one or more, and "a plurality of" refers to two or more. In the description of the embodiments of the present disclosure, "/" indicates an alternative meaning, for example, A/B indicates A or B; "and/or" herein is only an association relationship that describes the associated objects, and indicates that there are three relationships. For example, A and/or B may indicate that: only A is present, both A and B are present, and only B is present. In addition, to facilitate a clear description of technical solutions of the embodiments of the present disclosure, in the embodiments of the present disclosure, words such as "first" and "second" are adopted to distinguish identical items or similar items with substantially identical functions and actions. Those skilled in the art are appreciated that the terms "first," "second," and the like do not limit quantity and execution order, but rather the terms "first," "second," and the like do not limit that they are not necessarily different.

Described above are the embodiments of the present disclosure and are not intended to limit the present disclosure. Any modifications, equivalents, improvements, and the like, made within the spirit and principle of the present disclosure should fall within the protection scope of the present disclosure.

What is claimed is:

1. A method for processing an image, comprising:

determining a target processing mode corresponding to a first image to be processed;

determining, based on the target processing mode, image processing parameters corresponding to the first image, wherein the image processing parameters further comprise a contrast enhancement ratio;

performing, based on the contrast enhancement ratio, contrast enhancement processing on the first image;

determining, based on the image processing parameters and an initial pixel value of a pixel in the first image, a target pixel value of the pixel from pixel values corresponding to a plurality of alternative colors; and acquiring a second image by converting the initial pixel value of the pixel in the first image into the target pixel value;

wherein said performing, based on the contrast enhancement ratio, contrast enhancement processing on the first image comprises:

transforming the first image from an RGB color space to an HSV color space;

acquiring first brightness by determining a mean value of V components of pixels in the first image;

performing, based on a gamma transformation parameter corresponding to the contrast enhancement ratio, gamma transformation on the V component of each of the pixels;

acquiring second brightness by determining a mean value of the V components of the pixels after gamma transformation;

acquiring the first image with an enhanced contrast in the HSV color space by keeping H components and S components of the pixels unchanged and adding a difference between the first brightness and the second brightness on the V components of the pixels after gamma transformation; and acquiring the first image with an enhanced contrast by transforming the first image with the enhanced contrast in the HSV color space to the RGB space.

2. The method for processing the image according to claim 1, wherein said determining the target processing mode corresponding to the first image to be processed comprises:

acquiring an identification result by identifying a type of an object in the first image;

determining, in a case that the identification result comprises one object type and the object type is a first object type, an image processing mode corresponding to the first object type in a plurality of image processing modes as a candidate processing mode corresponding to the first image; and determining, based on the candidate processing mode, the target processing mode.

3. The method for processing the image according to claim 1, wherein said determining the target processing mode corresponding to the first image to be processed comprises:

acquiring an identification result by identifying a type of an object in the first image;

determining, in a case that the identification result comprises a plurality of object types, area ratios of imaging areas of objects respectively corresponding to the plurality of object types in the first image;

determining an image processing mode corresponding to a second object type in the plurality of image processing modes as a candidate processing mode corresponding to the first image, wherein the second object type is an object type with a largest area ratio in the plurality of object types; and determining, based on the candidate processing mode, the target processing mode.

4. The method for processing the image according to claim 2, wherein said determining, based on the candidate processing mode, the target processing mode comprises:

displaying a first user interface, wherein the first user interface comprises description information of the candidate processing mode;

determining, in response to a mode confirmation instruction, the candidate processing mode as the target processing mode; and determining, in response to a mode customization instruction, a customized mode as the target processing mode.

5. The method for processing the image according to claim 1, wherein said determining, based on the target processing mode, the image processing parameters corresponding to the first image comprises:

determining, in a case that the target processing mode is one of a plurality of image processing modes, image processing parameters corresponding to the target processing mode as the image processing parameters corresponding to the first image.

6. The method for processing the image according to claim 1, wherein said determining, based on the target processing mode, the image processing parameters corresponding to the first image comprises:

displaying, in a case that the target processing mode is a customized mode, a second user interface, wherein the second user interface comprises a plurality of customized parameter items;

acquiring customized parameters input in the plurality of customized parameter items; and determining the customized parameters input in the plurality of customized parameter items as the image processing parameters corresponding to the first image.

7. The method for processing the image according to claim 1, wherein the plurality of alternative colors comprise a first alternative color having a hue, and the image processing parameters comprise a first color ratio, wherein the first color ratio is configured to distinguish the first alternative color from other alternative colors; and determining, based on the image processing parameters and the initial pixel value of the pixel in the first image, the target pixel value of the pixel from the pixel values corresponding to the plurality of alternative colors comprises:

determining a distance between the initial pixel value of the pixel and a pixel value corresponding to the first alternative color; and determining, in a case that the distance is smaller than a distance threshold corresponding to the first color ratio, the pixel value corresponding to the first alternative color as the target pixel value of the pixel.

8. The method for processing the image according to claim 7, wherein the plurality of alternative colors further comprise a second alternative color having no hue and a third alternative color having no hue, a gray scale of the second alternative color being smaller than a gray scale of the third alternative color, and the image processing parameters further comprise a second color ratio, the second color ratio being configured to distinguish the second alternative color from the third alternative color; and upon determining the distance between the initial pixel value of the pixel and the pixel value corresponding to the first alternative color, the method further comprises:

determining, in response to the distance being not smaller than the distance threshold corresponding to the first color ratio, a gray-scale value of the pixel in the first image based on the initial pixel value; and determining the target pixel value of the pixel based on the gray-scale value; wherein, determining, in a case that the gray-scale value is smaller than a gray-scale threshold corresponding to the second color ratio, a pixel value corresponding to the second alternative color as the target pixel value of the pixel; and determining, in a case that the gray-scale value is not smaller than the gray-scale threshold corresponding to the second color ratio, a pixel value corresponding to the third alternative color as the target pixel value of the pixel.

9. The method for processing the image according to claim 1, wherein the image processing parameters further comprise a sharpening ratio; and prior to determining, based on the image processing parameters and the initial pixel value of the pixel in the first image, the target pixel value of the pixel from the pixel values corresponding to the plurality of alternative colors, the method further comprises:

performing, based on the sharpening ratio, sharpening processing on the first image.

10. The method for processing the image according to claim 9, wherein said performing, based on the sharpening ratio, sharpening processing on the first image comprises:

acquiring a brightness channel map by transforming the first image from an RGB color space to an HSV color space;

acquiring a first filtered map by performing, based on the sharpening ratio, guided filtering on the brightness channel map;

acquiring a first detail map by separating the first filtered map from the brightness channel map;

acquiring a first enhancement map by superposing the first detail map onto the brightness channel map;

acquiring a second filtered map by performing, based on the sharpening ratio, Gaussian filtering on the first enhancement map;

acquiring a second detail map by separating the second filtered map from the first enhancement map;

acquiring a second enhancement map by superposing the second detail map onto the first enhancement map; and acquiring a sharpened first image by transforming the second enhancement map from the HSV color space to the RGB color space.

11. The method for processing the image according to claim 1, wherein the image processing parameters further comprise an error truncation ratio; and prior to converting the initial pixel value of the pixel in the first image into the target pixel value, the method further comprises:

acquiring an error value by determining a difference between the initial pixel value and the target pixel value; and performing, based on the error value and the error truncation ratio, error diffusion on the target pixel value.

12. The method for processing the image according to claim 1, further comprising:

displaying a third user interface, wherein the third user interface comprises a third image, the third image comprising at least two different second images converted from the first image.

13. An apparatus for processing an image, comprising:

a processor; and a memory configured to store one or more instructions executable by the processor;

wherein the processor, when loading and executing the one or more instructions, is caused to perform;

determining a target processing mode corresponding to a first image to be processed;

determining, based on the target processing mode, image processing parameters corresponding to the first image, wherein the image processing parameters further comprise a contrast enhancement ratio;

performing, based on the contrast enhancement ratio, contrast enhancement processing on the first image;

determining, based on the image processing parameters and an initial pixel value of a pixel in the first image, a target pixel value of the pixel from pixel values corresponding to a plurality of alternative colors; and acquiring a second image by converting the initial pixel value of the pixel in the first image into the target pixel value;

wherein said performing, based on the contrast enhancement ratio, contrast enhancement processing on the first image comprises:

transforming the first image from an RGB color space to an HSV color space;

acquiring first brightness by determining a mean value of V components of pixels in the first image;

performing, based on a gamma transformation parameter corresponding to the contrast enhancement ratio, gamma transformation on the V component of each of the pixels;

acquiring second brightness by determining a mean value of the V components of the pixels after gamma transformation;

acquiring the first image with an enhanced contrast in the HSV color space by keeping H components and S components of the pixels unchanged and adding a difference between the first brightness and the second brightness on the V components of the pixels after gamma transformation; and acquiring the first image with an enhanced contrast by transforming the first image with the enhanced contrast in the HSV color space to the RGB space.

14. A non-transitory computer-readable storage medium storing a computer program, wherein the computer program, when executed by a processor, causes the processor to perform the method as defined in claim 1.

15. The method for processing the image according to claim 3, wherein said determining, based on the candidate processing mode, the target processing mode comprises:

displaying a first user interface, wherein the first user interface comprises description information of the candidate processing mode;

determining, in response to a mode confirmation instruction, the candidate processing mode as the target processing mode; and determining, in response to a mode customization instruction, a customized mode as the target processing mode.

16. The method for processing the image according to claim 2, wherein the plurality of alternative colors comprise a first alternative color having a hue, and the image processing parameters comprise a first color ratio, wherein the first color ratio is configured to distinguish the first alternative color from other alternative colors; and determining, based on the image processing parameters and the initial pixel value of the pixel in the first image, the target pixel value of the pixel from the pixel values corresponding to the plurality of alternative colors comprises:

determining a distance between the initial pixel value of the pixel and a pixel value corresponding to the first alternative color; and determining, in a case that the distance is smaller than a distance threshold corresponding to the first color ratio, the pixel value corresponding to the first alternative color as the target pixel value of the pixel.

17. The method for processing the image according to claim 3, wherein the plurality of alternative colors comprise a first alternative color having a hue, and the image processing parameters comprise a first color ratio, wherein the first color ratio is configured to distinguish the first alternative color from other alternative colors; and determining, based on the image processing parameters and the initial pixel value of the pixel in the first image, the target pixel value of the pixel from the pixel values corresponding to the plurality of alternative colors comprises:

determining a distance between the initial pixel value of the pixel and a pixel value corresponding to the first alternative color; and determining, in a case that the distance is smaller than a distance threshold corresponding to the first color ratio, the pixel value corresponding to the first alternative color as the target pixel value of the pixel.

* * * * *